(No Model.)

P. S. SNYDER.
HEDGE FENCE TRAINER.

No. 488,955. Patented Dec. 27, 1892.

Attest:
H. P. Wilson
J. H. Griffin

Inventor,
Pius S. Snyder
per M. D. Peck
His Att'y

UNITED STATES PATENT OFFICE.

PIUS S. SNYDER, OF JACOBUS, PENNSYLVANIA.

HEDGE-FENCE TRAINER.

SPECIFICATION forming part of Letters Patent No. 488,955, dated December 27, 1892.

Application filed March 16, 1892. Serial No. 425,146. (No model.)

*To all whom it may concern:*

Be it known that I, PIUS S. SNYDER, a citizen of the United States, residing at Jacobus, in the county of York and State of Pennsylvania, have invented certain new and useful Improvements in Hedge-Fence Trainers; and I do hereby declare the following to be a full, clear, and exact description of the invention, such as will enable others skilled in the art to which it appertains to make and use the same, reference being had to the accompanying drawings, which form part of this specification.

My invention relates to hedge fence trainers and has for its object the construction of a continuous line wire having eyes thereon used in connection with independent short loops of wire or other material adapted to be attached to it, and to form therewith loops for holding the growing hedge plants in the required position, and it consists in the construction hereinafter described and more particularly pointed out in the claim.

Figure 1:
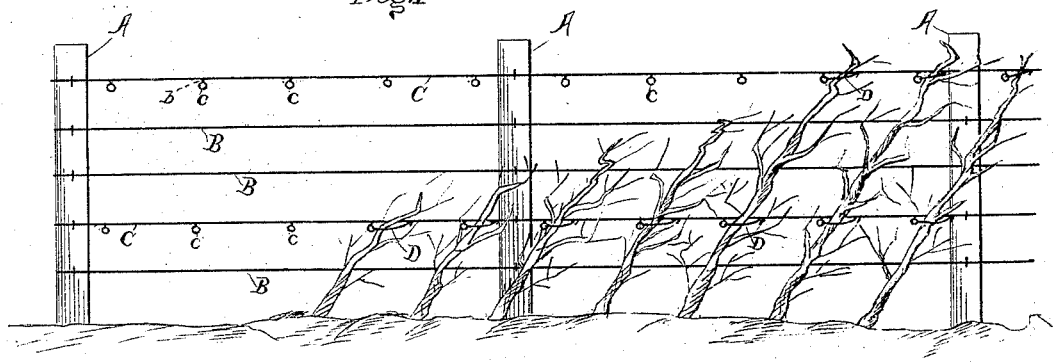
Figure 2:
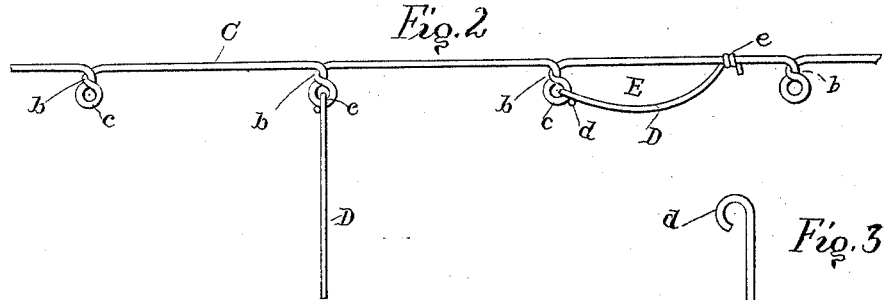
Figure 3:
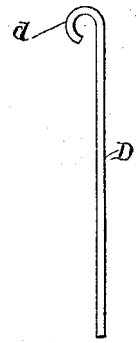
Figure 4:
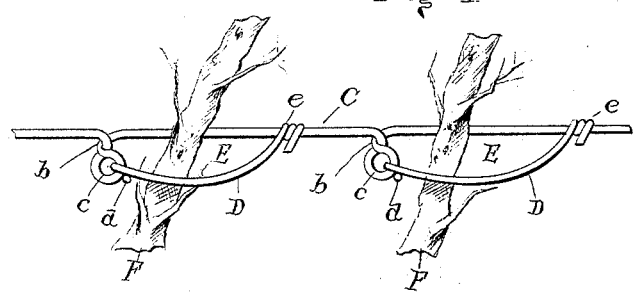

Referring to the accompanying drawings; Figure 1. is a side elevation of a section of hedge fence embodying my improvement; Fig. 2. is a view, on an enlarged scale, of my improved line wire and the short hook loops connected to it; Fig. 3. is a view of one of the short hook loops of wire, detached; and, Fig. 4. is a view, on an enlarged scale, of a portion of the line wire and two short hook loops of wire connected to it, to form loops around the hedge plants.

Similar letters of reference indicate corresponding parts in each figure of the drawings.

A. represents fence posts and B. the ordinary straight line wires strung thereon.

C. represents continuous line wires strung along the posts, and provided with a series of eyes $c$, in their length. These eyes are formed by doubling the wire on itself at certain points in its length and then twisting the double portion around upon itself, as indicated at $b$, in Figs. 2 and 4. By giving the portions of wire forming the eyes $c$, a double twist, the wire C. can be stretched on the posts as easily and as taut, as could an ordinary straight wire, without in any manner destroying the integrity of the unyielding eyes.

D. represents the independent short hook loop wires that are kept separate and detached from the line wire C. until the hedge plants are of sufficient growth to require training when they are used in connection with the continuous line wires. Strong cords may be used as a substitute for the loop wires, though I prefer the latter. Each short hook loop wire D. is bent at one end to form a hook $d$, which is placed in the twisted eye $c$, of the line wire, and its hook portion preferably closed or bent down upon its body with a pair of pliers or other suitable instrument, to prevent its accidental removal by wind, jarring of the fence, or other causes. The body of the wire D. is then bent around the stem of the hedge plant and its other end coiled around the line wire C. as indicated at $e$. Large loops E. are thus formed which loosely inclose the stems of the plants F. and hold them in the desired position.

As illustrated in the drawings two wires C. having the twisted eyes $c$, formed thereon are used in connection with three plain line wires B, but I do not intend thereby to limit myself to such an arrangement, as all the line wires may have eyes formed on them, or alternate ones, as desired.

A very important advantage of my improved line wire is that it can be wound on a reel and unwound therefrom without becoming entangled, which would not be the case were the short hook loop wires D. connected to it. The hook loop wires may be packed in bundles for transportation and can thus be readily shipped with the reels of line wire. As the independent short hook loop wires D. are not attached to the line wires C. until they are required to be looped around the hedge plants, they do not detract from the appearance of the fence during the early period of the growth of the plant, nor are they a source of danger to cattle that may be grazing in proximity to the fence.

Still another advantage is that the short lengths may be twined on either side of the eye in the line wire to form the loop around the stem of the hedge plants.

Having thus fully described my invention what I claim as new and desire to secure by Letters Patent of the United States is;

In a hedge fence trainer, the combination with a continuous line wire, doubled upon itself at intervals, and the doubled portions twisted to form unyielding eyes to adapt the wire to be drawn taut, of a series of independent short hook-loop wires, each having a hook end to engage an eye in the line wire and a straight end to be coiled around the line wire, the said short wires forming with the line wire, a series of loops to inclose the stems of the hedge plant, substantially as set forth.

In testimony whereof I affix my signature in presence of two witnesses.

PIUS S. SNYDER.

Witnesses:
J. H. GRIFFIN,
M. D. PECK.